(12) United States Patent
Trotter et al.

(10) Patent No.: US 10,054,179 B2
(45) Date of Patent: Aug. 21, 2018

(54) COMPRESSION-LIMITING RING LINK ASSEMBLY

(71) Applicant: ILLINOIS TOOL WORKS INC., Glenview, IL (US)

(72) Inventors: Jason K. Trotter, Des Plaines, IL (US); Dennis M. Mark, Buffalo Grove, IL (US); Glenn Heavens, Sr., Naugatuck, CT (US); Jason D. Holt, Lexington, KY (US)

(73) Assignee: Illinois Tool Works Inc., Glenview, IL (US)

( * ) Notice: Subject to any disclaimer, the term of this patent is extended or adjusted under 35 U.S.C. 154(b) by 74 days.

(21) Appl. No.: 14/902,406

(22) PCT Filed: Jun. 11, 2014

(86) PCT No.: PCT/US2014/041882
§ 371 (c)(1),
(2) Date: Dec. 31, 2015

(87) PCT Pub. No.: WO2015/012966
PCT Pub. Date: Jan. 29, 2015

(65) Prior Publication Data
US 2016/0369860 A1 Dec. 22, 2016

Related U.S. Application Data

(60) Provisional application No. 61/857,873, filed on Jul. 24, 2013.

(51) Int. Cl.
*F16F 1/38* (2006.01)
*B60G 7/00* (2006.01)
*B60G 21/055* (2006.01)

(52) U.S. Cl.
CPC ............... *F16F 1/38* (2013.01); *B60G 7/001* (2013.01); *B60G 21/0551* (2013.01);
(Continued)

(58) Field of Classification Search
CPC .......... F16F 1/38; F16F 1/3828; F16F 1/3842; F16F 1/3863; B60G 7/001; B60G 7/00;
(Continued)

(56) References Cited

U.S. PATENT DOCUMENTS

| 1,911,866 | A | | 5/1933 | Wylie | |
|---|---|---|---|---|---|
| 2,468,985 | A | * | 5/1949 | Krotz | F16L 5/10 16/2.1 |

(Continued)

FOREIGN PATENT DOCUMENTS

| CN | 1215457 | 4/1999 |
|---|---|---|
| CN | 101391567 | 3/2009 |

(Continued)

OTHER PUBLICATIONS

ISR and WO for PCT/US2014/041882 dated Sep. 26, 2014.

*Primary Examiner* — William L Miller
(74) *Attorney, Agent, or Firm* — Joseph M. Butscher; The Small Patent Law Group, LLC

(57) ABSTRACT

A ring link assembly may include a connecting ring including an annular body defining a central opening, a bushing defining a central passage, wherein the bushing is retained by the connecting ring within the central opening, a compression limiter positioned within the central passage of the bushing, and first and second bushing limiters secured to the compression limiter at opposite ends. The first and second bushing limiters securely connect to the compression limiter and the bushing.

17 Claims, 5 Drawing Sheets

(52) U.S. Cl.
CPC .......... *F16F 1/3828* (2013.01); *F16F 1/3842* (2013.01); *F16F 1/3863* (2013.01); *B60G 2204/1224* (2013.01); *B60G 2204/41* (2013.01); *B60G 2206/11* (2013.01); *B60G 2206/82* (2013.01); *Y10T 16/05* (2015.01)

(58) Field of Classification Search
CPC ........ B60G 21/0551; B60G 2204/1224; B60G 2204/41; B60G 2206/11; B60G 2206/82; Y10T 16/05
USPC ...... 16/2.1; 74/592; 267/293, 292, 276, 141; 280/124.77; 403/228
See application file for complete search history.

(56) References Cited

U.S. PATENT DOCUMENTS

| | | | | |
|---|---|---|---|---|
| 3,230,000 | A * | 1/1966 | Simpson | B25B 27/28 267/270 |
| 3,298,762 | A | 1/1967 | Peck | |
| 3,784,180 | A * | 1/1974 | Massinger | B60G 7/00 267/293 |
| 4,109,979 | A * | 8/1978 | Estaque | B60G 7/02 267/269 |
| 4,491,429 | A * | 1/1985 | Matoba | B60G 7/00 267/154 |
| 4,619,544 | A * | 10/1986 | Laidely | B60G 5/02 16/2.1 |
| 4,667,943 | A * | 5/1987 | Izumi | B60G 3/225 267/141.3 |
| 4,744,677 | A * | 5/1988 | Tanaka | F16F 1/371 267/141 |
| 4,765,647 | A | 8/1988 | Kondo et al. | |
| 4,767,108 | A * | 8/1988 | Tanaka | B60G 7/00 267/140.12 |
| 4,809,960 | A * | 3/1989 | Kakimoto | B60G 7/00 248/634 |
| 4,944,523 | A * | 7/1990 | Hardy, Jr. | B60G 21/0551 280/124.152 |
| 5,275,429 | A * | 1/1994 | Bunker | B60G 7/02 280/124.177 |
| 5,380,036 | A * | 1/1995 | Perkins | B60G 7/00 280/124.106 |
| 5,472,226 | A * | 12/1995 | Bunker | B60G 7/02 267/141.3 |
| 5,707,073 | A * | 1/1998 | Stuker | B60G 21/0551 280/124.125 |
| 5,794,965 | A * | 8/1998 | Stuker | B60G 21/0551 280/124.169 |
| 6,354,614 | B1 | 3/2002 | Ham, Jr. et al. | |
| 6,619,639 | B1 | 9/2003 | Shelley et al. | |
| 9,610,818 | B2 * | 4/2017 | Mark | B60K 5/1241 |
| 2001/0040326 | A1 | 11/2001 | Balczun et al. | |
| 2009/0134292 | A1 | 5/2009 | Kubai | |

FOREIGN PATENT DOCUMENTS

| | | |
|---|---|---|
| DE | 3122311 A1 | 3/1982 |
| DE | 102012216297 | 3/2013 |
| EP | 0271879 A2 | 6/1988 |
| FR | 2693152 | 1/1994 |
| GB | 593466 | 10/1947 |
| GB | 884170 | 12/1961 |
| JP | S58141907 A | 8/1983 |
| JP | H05141462 A | 6/1993 |
| JP | H0681970 B2 | 10/1994 |
| JP | H1151099 A | 2/1999 |
| JP | H1163058 A | 3/1999 |
| WO | 0077416 A2 | 12/2000 |
| WO | WO 2006018684 | 2/2006 |

* cited by examiner

COMPRESSION-LIMITING RING LINK ASSEMBLY

RELATED APPLICATIONS

This application is a National Phase of PCT/US2014/041882 filed Jun. 11, 2014 and relates to and claims priority benefits from U.S. Provisional Patent Application No. 61/857,873 filed Jul. 24, 2013, which is hereby incorporated by reference in its entirety.

FIELD OF EMBODIMENTS OF THE DISCLOSURE

Embodiments of the present disclosure generally relate to ring link assemblies, and more particularly to compression-limiting ring link assemblies.

BACKGROUND

Various vehicles utilize ring links to connect certain components together. For example, ring links may be used to connect a suspension system to a stabilizer bar. Ring links may provide a stabilizer bar end link that connects and transfers forces between the stabilizer bar and a movable suspension component, such as a lower control arm, spring link, or the like. In such applications, the ring links transmit loads between the suspension system and the stabilizer bar. As such, the ring links allow stable cornering and reduce body roll. Compared to directly bolting the stabilizer bar to the suspension system, the ring links allow additional articulation and provide flexibility when designing a vehicle.

A typical ring link assembly includes a main body having an elastomeric bushing at opposite ends. Each bushing is typically held within a passage by friction and compression of the rubber. Additionally, outer retaining lips may retain the bushings in place. A known ring link includes a metal tube that acts as a tube limiter and is bonded to a rubber bushing. Typically, the inner diameter of the bushing and the outer diameter of the tube limiter are generally cylindrical to allow for press fitting. The bushing may axially shift with respect to the tube limiter, or vice versa. In general, the longer the tube limiter is, the greater the potential for such migration.

However, bushing migration relative to the tube limiter may prematurely wear the bushing, erode coating from tube limiter, and allow debris to infiltrate between the bushing and tube limiter, thereby generating undesired noise and/or reducing performance.

SUMMARY OF EMBODIMENTS OF THE DISCLOSURE

Certain embodiments of the present disclosure provide a ring link assembly that may include a connecting ring including an annular body defining a central opening, a bushing defining a central passage, wherein the bushing is retained by the connecting ring within the central opening, a compression limiter positioned within the central passage of the bushing, and first and second bushing limiters secured to the compression limiter at opposite ends. The first and second bushing limiters securely connect to the compression limiter and the bushing.

The compression limiter may include at least one securing member that is configured to secure to a portion of one or both of the first and second bushing limiters. For example, each of the first and second bushing limiters may include an end collar, and the securing member(s) may securely abut into the end collars to secure the first and second bushing limiters to the compression limiter.

In at least one embodiment, each of the first and second bushing limiters may include one or more internal guide members that axially align the compression limiter within a central chamber. In at least one embodiment, each of the first and second bushing limiters may include a tapered outer surface from a flared end to an end collar.

The first and second bushing limiters may cooperate to form a bushing-retaining recess therebetween. The bushing may include an inwardly-directed retained member that is compressively retained within the bushing-retaining recess. As one example, the inwardly-directed retained member may an inwardly-directed annular ridge.

In at least one embodiment, each of the first and second bushing limiters may include a bushing-limiting barrier. The bushing may be retained between the bushing-limiting barriers.

One or both of an outer and interior surface of the bushing may be inwardly tapered from opposite ends toward a central sleeve. Alternatively, one or both of an outer and interior surface of the bushing may be straight, such that it does not include any taper, angle, cant, or the like.

In at least one embodiment, the compression limiter may extend past both ends of the bushing. Further, each of the first and second bushing limiters may include an extension sleeve that extends over at least a portion of the compression limiter.

Certain embodiments of the present disclosure provide a ring link assembly that may include a bushing defining a central passage, a compression limiter positioned within the central passage of the bushing, and first and second bushing limiters secured to the compression limiter at opposite ends. The first and second bushing limiters securely connect to the compression limiter and the bushing. The first and second bushing limiters prevent the bushing from axially shifting relative to the compression limiter.

Figure 1:
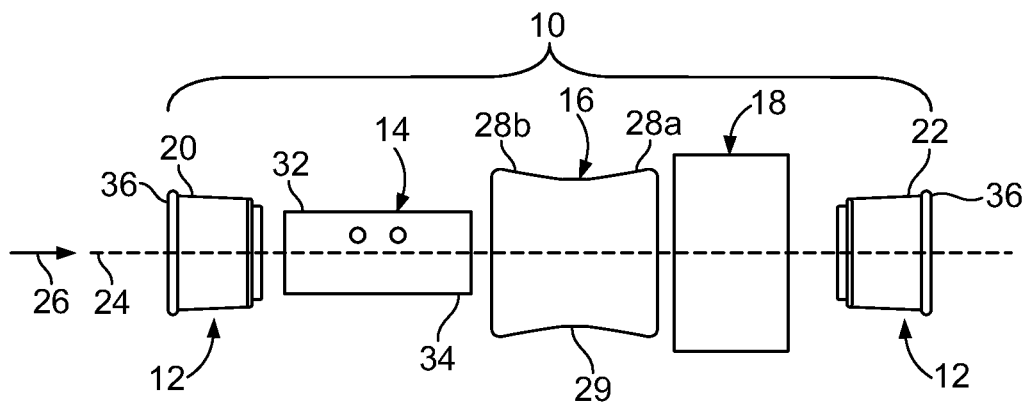
FIG. 1 illustrates a lateral exploded view of a compression-limiting ring link assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates a lateral exploded view of a compression-limiting ring link assembly 10, according to an embodiment of the present disclosure. The ring link assembly 10 may include opposed end bushing limiters 12, a compression limiter 14, a central bushing 16, and a connecting ring 18. The bushing limiters 12 may be formed of metal or plastic and may be positioned at opposite ends 20 and 22 of the ring link assembly 10. The compression limiter 14 may be a metal or plastic cylindrical tube, for example. The central bushing 16 may be a resilient tubular member, such as formed of an elastomeric material (for example, rubber), having a central passage formed therethrough. The ring 18 may be an annular metal ring, for example.

In order to form the ring link assembly 10, the bushing 16 is aligned with a central opening of the ring 18 in relation to a common longitudinal axis 24. The bushing 16 is then urged into a central opening of the ring 18 in the direction of arrow 26.

Figure 2:
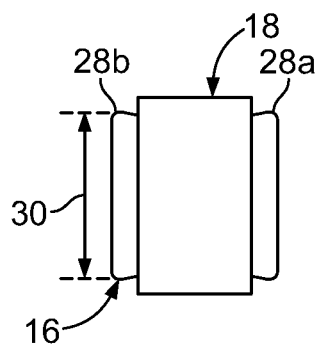
FIG. 2 illustrates a lateral view of a bushing secured within a ring link according to an embodiment of the present disclosure.

FIG. 2 illustrates a lateral view of the bushing 16 secured within the central opening of the ring 18. Referring to FIGS. 1 and 2, the bushing 16 may include outwardly flared conical ends 28a and 28b connected to a recessed central sleeve 29. The outer diameter 30 of each end 28a and 28b may be greater than an inner diameter of the ring 18 that defines the central opening. When the bushing 16 is urged into the central opening, the leading end 28a may compressively flex inward to pass into the central opening. When the leading end 28a passes through the central opening of the ring 18, the leading end 28a may flex back to its at-rest position (and/or be forced outward to further secure to the bushing 16), so that that the ring 18 is securely trapped onto the central sleeve 29 between the ends 28a and 28b. After the bushing 16 is secured to the ring 18, the compression limiter 14 may be aligned in relation to the longitudinal axis 24 with the central passage of the bushing 16. The compression limiter 14 may then be inserted into the central passage of the bushing 16 in the direction of arrow 26.

Figure 3:
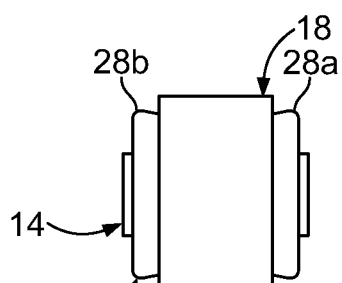
FIG. 3 illustrates a lateral view of a compression limiter positioned within a bushing that is secured within a ring link, according to an embodiment of the present disclosure.

FIG. 3 illustrates a lateral view of the compression limiter 14 positioned within the central passage of the bushing 16, which is, in turn, secured within the central opening of the ring 18. In the position shown in FIG. 3, the compression limiter 14 may loosely fit within the central passage of the bushing 16. For example, the bushing 16 may not securely connect to and/or retain the compression limiter 14. Referring to FIGS. 1 and 3, after the compression limiter 14 is positioned within the central passage of the bushing 16, the bushing limiters 12 may secure over opposite ends 32 and 34 of the compression limiter 14, and securely connect within the central passage of the bushing 16, in order to complete the ring link assembly 10. Alternatively, before the compression limiter 14 is inserted into the central passage of the bushing 16, the bushing limiters 12 may first be secured over opposite ends 32 and 34 of the compression limiter 14, which may then be inserted into the central passage of the bushing 16.

Figure 4:
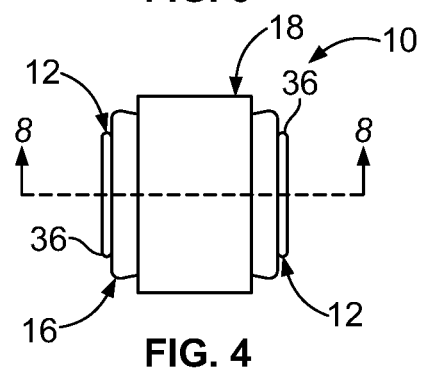
FIG. 4 illustrates a lateral view of a formed compression-limiting ring link assembly, according to an embodiment of the present disclosure.

FIG. 4 illustrates a lateral view of the formed compression-limiting ring link assembly 10, according to an embodiment of the present disclosure. As shown, the compression limiter 14 (shown in FIGS. 1 and 3) is hidden from view by the outwardly-flared ends 36 of the bushing limiters 12.

Figure 5:
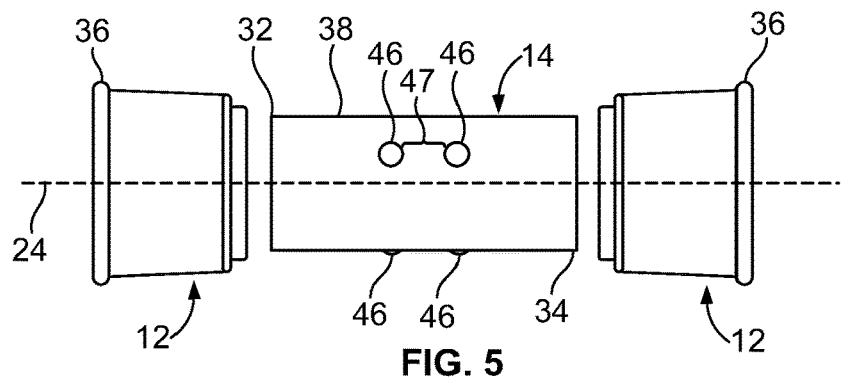
FIG. 5 illustrates opposed bushing limiters axially aligned with a compression limiter, according to an embodiment of the present disclosure.
Figure 6:
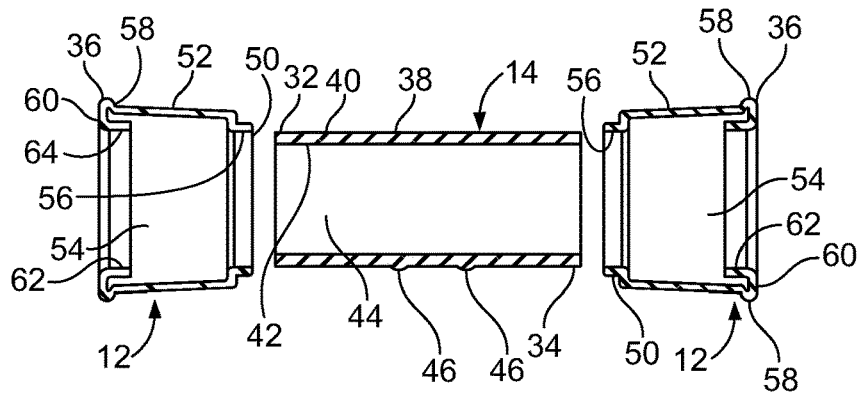
FIG. 6 illustrates a transverse cross-sectional view of opposed bushing limiters axially aligned with a compression limiter, according to an embodiment of the present disclosure.

FIG. 5 illustrates the opposed bushing limiters 12 axially aligned with the compression limiter 14, according to an embodiment of the present disclosure. FIG. 6 illustrates a transverse cross-sectional view of the opposed bushing limiters 12 axially aligned with the compression limiter 14. Referring to FIGS. 5 and 6, the compression limiter 14 may include a tubular main body 38 having an outer diameter 40 and an inner diameter 42 that defines a central channel 44. Bushing limiter-securing members 46, such a retaining locks, may radially and outwardly extend from an outer surface of the main body 38. The securing members 46 may be semi-spherical nubs, studs, bumps, or other such protuberances. Alternatively, the securing members 46 may be various other shapes and sizes other than semi-spherical. For example, the securing members 46 may be blocks. As shown, a plurality of securing members 46 may outwardly extend from the main body 38. The securing members 46 may be regularly spaced about a circumference of the main body 38. Further, pairs of securing members 46 may be spaced in relation to one another with respect to the longitudinal axis 24. For example, a pair of securing members 46 may include one securing member 46 closer to the end 32, with the other securing member 46 closer to the end 34. Longitudinally-aligned securing members may be separated by a space 47, which may be a span that allows for opposed end collars 50 (described below) of opposed bushing limiters 12 to be secured therein. More or less securing members 46 than shown may be used. For example, instead of pairs, a single securing member 46 may be aligned at a middle plane of the main body 38. Further, instead of spaced protuberances, the securing member 46 may be or include one or more annular ridges that extend outwardly from the main body 38.

Each bushing limiter 12 may include an end collar 50 connected to a flared end 36 through an outer wall 52 that may outwardly expand from the end collar 50 to the flared end 36. As shown, the outer wall 52 may taper down from the outer wall 52 to the end collar 50. A central chamber 54 is defined through each bushing limiter 12. An inner diameter 56 of the end collar 50 may be greater than the outer diameter 40 of the compression limiter 14. As such, the end collar 40 may slide over the outer surface of the compression limiter 14. The end collar 50 may provide a lead-in feature that is configured to lead the bushing limiter 12 onto and over the outer surface of the compression limiter 14. Further, the end collar 50 may provide a lead-in feature that is configured to lead the busing limiter 12 into the inner diameter of the bushing 16.

Each flared end 36 may include an upwardly-extending bushing-limiting barrier 58, such as a flange, rim, ridge, or the like, that connects to a flat bearing surface 60. The bearing surface 60 may, in turn, connect to an inwardly-directed sleeve 62 that extends into the central chamber 54. An inner diameter 64 defined by the sleeve 62 may be the same as the inner diameter 56 of the end collar 50. As such, the inner diameter 64 of the sleeve 62 and the inner diameter 56 of the end collar 50 may be longitudinally aligned. For example, the inner diameter 64 and the inner diameter 56 may form portions of a common longitudinal envelope formed about the longitudinal axis 24. The end collar 50 and the sleeve 62 may provide guide members that are configured to guide and align the compression limiter 14 within the central chamber 54.

Figure 7:
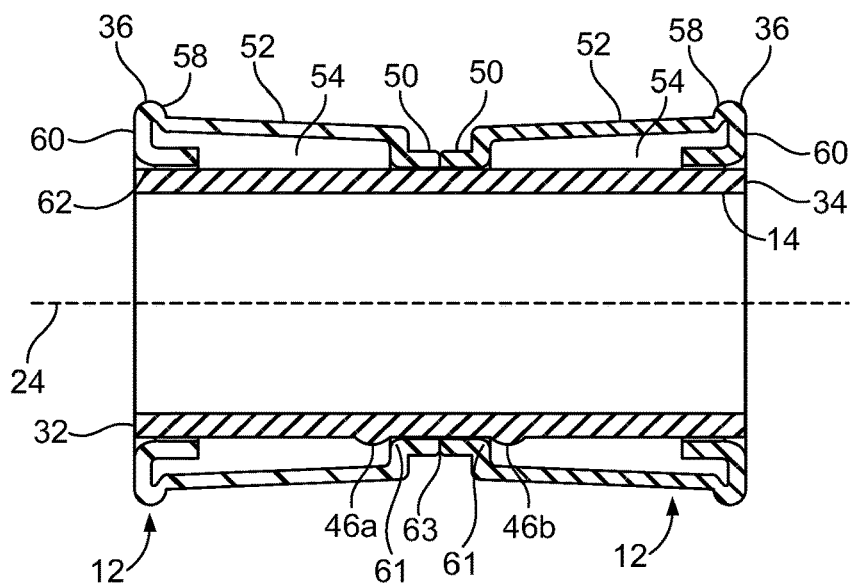
FIG. 7 illustrates a transverse cross-sectional view of bushing limiters secured to a compression limiter, according to an embodiment of the present disclosure.

FIG. 7 illustrates a transverse cross-sectional view of the bushing limiters 12 secured to the compression limiter 14, according to an embodiment of the present disclosure. As shown, the inwardly-directed sleeves 62 and the end collars 50 of the bushing limiters 12 align the compression limiter 14 within the central chambers 54 with respect to the longitudinal axis 24. The sleeves 62 may extend into the central chambers 54 a distance that is greater or less than shown. For example, the sleeves 62 may connect to the end collars 50, and a divot, groove, or other recessed area may be formed proximate to the end collars 50. The divot, groove, or other recessed area may be configured to receive and retain a securing member 46 of the compression limiter 14.

As each bushing limiter 12 is slid over a respective end 32 or 34 of the compression limiter 14, the inner diameters 56 of the end collars 50 may outwardly deflect (and/or the compression limiter 14 may inwardly deflect) as the end collars 50 slide over the respective securing members 46a and 46b. After the end collars 50 are moved past the securing members 46a and 46b, the end collars 50 and/or the compression limiter 14 may flex back to at-rest positions, such that internal ledges 61 of the end collars 50 secure to the securing members 46a and 46b. Accordingly, the end collars 50 may snapably or latchably secure to the securing members 46a and 46b. The interface between the internal ledges 61 and the securing members 46a and 46b prevents the bushing limiters 12 from undesirably retreating over the compression limiter 14 and disconnecting therefrom.

As shown, opposed end collars 50 of the opposed bushing limiters 12 may define a bushing-retaining recess 63 therebetween. As described below, a portion of the bushing 16, such as in inwardly-directed ridge, may be trapped within the bushing-retaining recess 16, thereby securely stabilizing the bushing 16 in relation to the compression limiter 14 and the bushing limiters 12.

As shown and described, the end collars 50 and the flared ends 36 of the bushing limiters 12 guide and align the compression limiter 14 within the central chambers 54. The securing members 46a and 46b secure to the end collars 50 to ensure that the bushing limiters 12 securely connect to the compression limiter 14.

Figure 8:
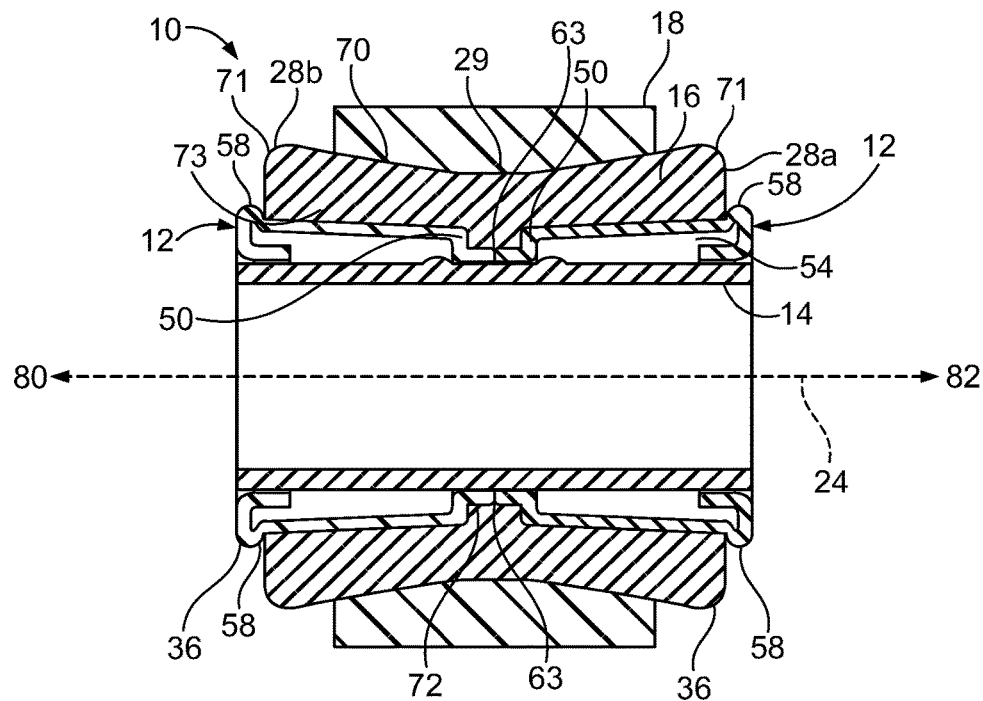
FIG. 8 illustrates a transverse cross-sectional view of a formed compression-limiting ring link assembly through line 8-8 of FIG. 4, according to an embodiment of the present disclosure.

FIG. 8 illustrates a transverse cross-sectional view of the formed compression-limiting ring link assembly 10 through line 8-8 of FIG. 4, according to an embodiment of the present disclosure. As noted above, when the bushing 16 is urged a central opening 70 of the ring 18, the leading end 28a may compressively flex inward to pass into the central opening 70. As shown, the ring 18 secures onto the central sleeve 29 of the bushing 16 between the ends 28a and 28b. Further, the bushing 16 may include a central inwardly-directed retained member, such as an annular ridge 72 (inwardly extending into the central passage 73 of the bushing 16), that is trapped within the bushing-retaining recess 63 between outer surfaces of the opposed end collars 50 of the opposed bushing limiters 12. At the same time, the ends 28a and 28b abut into the rims 58 of the flared ends 36, thereby securely trapping the bushing 16 between the opposed bushing limiters 12. As such, the opposed bushing limiters 12 limit the movement of the bushing 16, thereby preventing, minimizing, or otherwise reducing axial movement of the bushing 16 relative to the bushing limiters 12 and the compression limiter 14 in the directions of arrows 80 and 82.

Because the annular ridge 72 is trapped within the bushing-retaining recess 63 between the end collars 50, the bushing 16 may be prevented from sliding in the linear directions 80 and 82 that are parallel with the longitudinal axis 24. Accordingly, the interface between the annular ridge 72 and the end collars 50 may prevent the bushing 16 from dislodging from the bushing limiters 12, or vice versa. Alternatively, instead of a contiguous annular ridge, securing members, such as protuberances, as described above, may be spaced about an inner diameter of the bushing 16 and configured to be trapped between the end collars 50.

Similarly, because the outer diameter of each barrier 58 is greater than the inner diameter of the bushing 16, end edges 71 of the flared ends 36 abut into the barriers 58 thereby securing the bushing 16 in place with respect to the bushing limiters 12. The interface between the end edges 71 and the barrier 58 may prevent the bushing 16 from sliding with respect to the bushing limiters 12, or vice versa, in the linear directions 80 and 82 that are parallel with the longitudinal axis 24. Accordingly, the interface between the flared ends 36 and the barriers 58 may prevent the bushing 16 from dislodging from the bushing limiters 12, or vice versa. Alternatively, instead of a contiguous annular ridge, securing members, such as protuberances, as described above, may be spaced about an inner diameter of the bushing 16 and configured to be trapped between the end collars 50.

Alternatively, the bushing limiters 12 may not include the barrier 58. Instead, the bushing 16 may be secured in position with respect to the bushing limiters 12 by the annular ridge 72 being trapped between the opposed end collars 50. Alternatively, the bushing 16 may not include any portion that is trapped between the end collars 50. That is, the bushing limiters 12 may not form a bushing-retaining recess therebetween. Instead, the bushing 16 may be secured in position with respect to the bushing limiters 12 by the interface between flared ends 36 of the bushing 16 and the barriers 58 of the bushing limiters 12.

As described above, the bushing 16 secures into the central opening 70 of the ring 18. Further, the compression limiter 14 secures within the central chambers 54 of the bushing limiters 12, which, in turn, securely connect to the bushing 16. As such, the compression-limiting ring link assembly 10 may be formed.

Figure 9:
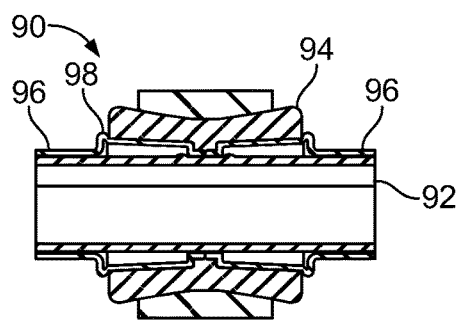
FIG. 9 illustrates a transverse cross-sectional view of a compression-limiting ring link assembly, according to an embodiment of the present disclosure.

FIG. 9 illustrates a transverse cross-sectional view of a compression-limiting ring link assembly 90, according to an embodiment of the present disclosure. The ring link assembly 90 is similar to the ring link assembly 10, except that a compression limiter 92 may extend past outer ends of a bushing 94. Further, parallel extension sleeves 96 may outwardly extend from flared ends 98. The extension sleeves 96 may secure over extended portions of the compression limiter 92. The outer surfaces of the bushing limiters may be tapered, similar to the bushing 16.

Figure 10:
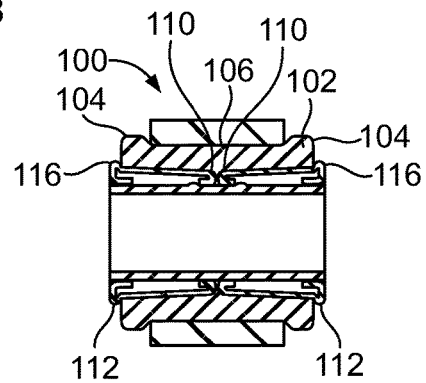
FIG. 10 illustrates a transverse cross-sectional view of a compression-limiting ring link assembly, according to an embodiment of the present disclosure.

FIG. 10 illustrates a transverse cross-sectional view of a compression-limiting ring link assembly 100, according to an embodiment of the present disclosure. As shown, a bushing 102 may include outer flanges 104 connected by a straight, linear tube 106. The bushing 102 may not include an inwardly-directed annular ridge, and opposed interior ends 110 of bushing limiters 112 may directly abut into one another (such that no bushing-retaining recess is formed). In this embodiment, the bushing 102 may be securely trapped between outer barriers 116 of the bushing limiters 112.

The ring link assembly 100 may not include a bushing-retaining recess, such as the bushing-retaining recess 63. Instead, a bushing 102 having a straight internal bore may be used for increased stiffness. The straight bore provides additional bushing compression compared to a tapered bushing (such as shown in FIG. 8, for example). In general, the bushing-retaining recess 63 (shown in FIG. 8, for example) provides a volume of space for an elastomeric bushing to flow into, thereby resulting in less pre-compression. Further, the outer surface of the bushing 102 may include a straight or tapered outer surface.

In addition to radial rate, the bushings may also have a conical rate caused when the bushing is articulated off-axis perpendicular to a regular bushing rotation. The conical rate of the bushing may be tuned by the angles of one or more of the bushing limiters, the ring link, and/or the bushing. For example, a bushing limiter with a straight outer diameter may have a conical rate that is lower than a limiter having a taper, such as a 5° taper.

As shown in FIG. 10, the ring link assembly 100 includes a generally straight bore bushing 102. The straight bore bushing 102 may be used with respect to applications of increased stiffness, for example.

Figure 11:
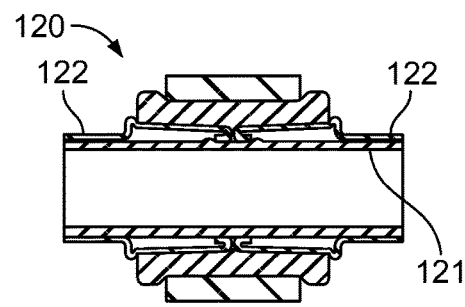
FIG. 11 illustrates a transverse cross-sectional view of a compression-limiting ring link assembly, according to an embodiment of the present disclosure.

FIG. 11 illustrates a transverse cross-sectional view of a compression-limiting ring link assembly 120, according to an embodiment of the present disclosure. The ring link assembly 120 is similar to the ring link assembly 100, except that the ring link assembly 120 may include an extended compression limiter 121 and bushing limiters 122, as described with respect to FIG. 9.

Figure 12:
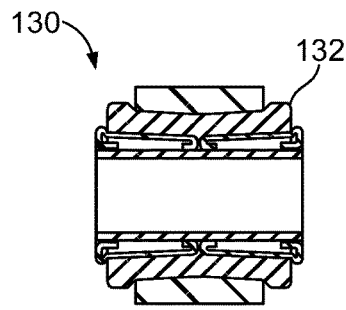
FIG. 12 illustrates a transverse cross-sectional view of a compression-limiting ring link assembly, according to an embodiment of the present disclosure.

FIG. 12 illustrates a transverse cross-sectional view of a compression-limiting ring link assembly 130, according to an embodiment of the present disclosure. The ring link assembly 130 is similar to the ring link assembly 100 shown and described with respect to FIG. 10, except that the ring link assembly 130 may include a bushing 132 having tapered outer surfaces.

Figure 13:
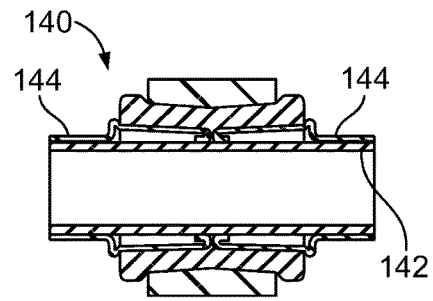
FIG. 13 illustrates a transverse cross-sectional view of a compression-limiting ring link assembly, according to an embodiment of the present disclosure.

FIG. 13 illustrates a transverse cross-sectional view of a compression-limiting ring link assembly 140, according to an embodiment of the present disclosure. The ring link assembly 140 is similar to the ring link assembly 130, except that the ring link assembly 140 may include an extended compression limiter 142 and bushing limiters 144, as described with respect to FIG. 9.

Figure 14:
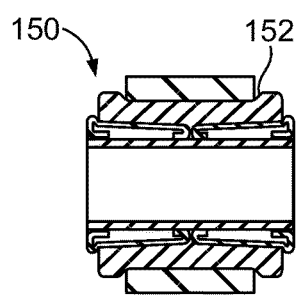
FIG. 14 illustrates a transverse cross-sectional view of a compression-limiting ring link assembly, according to an embodiment of the present disclosure.

FIG. 14 illustrates a transverse cross-sectional view of a compression-limiting ring link assembly 150, according to an embodiment of the present disclosure. The ring link assembly 150 is similar to the ring link assembly 10 shown in FIG. 8, except that the ring link assembly 150 may include a bushing 152 having a straight bore.

Figure 15:
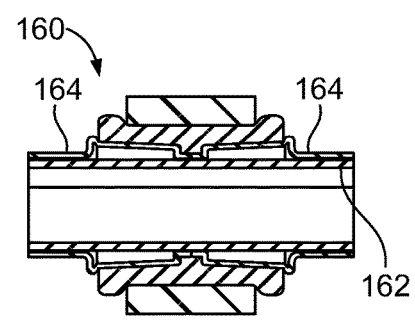
FIG. 15 illustrates a transverse cross-sectional view of a compression-limiting ring link assembly, according to an embodiment of the present disclosure.

FIG. 15 illustrates a transverse cross-sectional view of a compression-limiting ring link assembly 160, according to an embodiment of the present disclosure. The ring link assembly 160 is similar to the ring link assembly 150, except that the ring link assembly 160 may include an extended compression limiter 162 and bushing limiters 164, as described with respect to FIG. 9.

Figure 16:
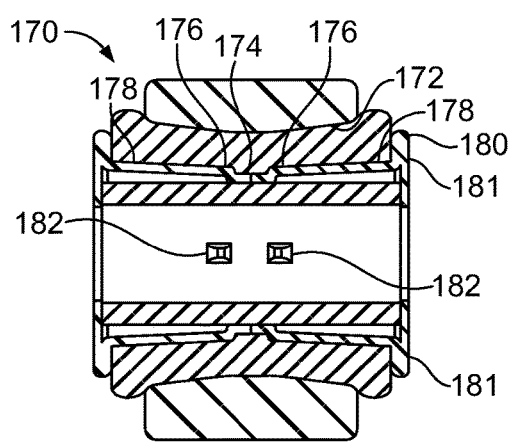
FIG. 16 illustrates a transverse cross-sectional view of a compression-limiting ring link assembly, according to an embodiment of the present disclosure.

FIG. 16 illustrates a transverse cross-sectional view of a compression-limiting ring link assembly 170, according to an embodiment of the present disclosure. As shown in FIG. 16, a bushing 172 may include an internally-directed annular ledge 174 that may be trapped between end collars 176 of opposed bushing limiters 178. Further, each bushing limiter 178 may include an outer flattened barrier 180, such as a rim, that does not abut into the bushing 172. Alternatively, the bushing 172 and/or the bushing limiters 178 may be sized and shaped so that the barrier 180 abuts into the bushing 172.

The barrier 180 may be taller, as compared to the barrier 58, described above. Accordingly, the barrier 180 provides an increased bearing surface 181 that may engage a larger surface of another component.

Additionally, the bushing 172 may include securing members 182, as described above. The securing members 182 may include ramped surfaces, for example. In one example, the securing members 182 may be pyramids that outwardly extend from the bushing 172.

Figure 17:
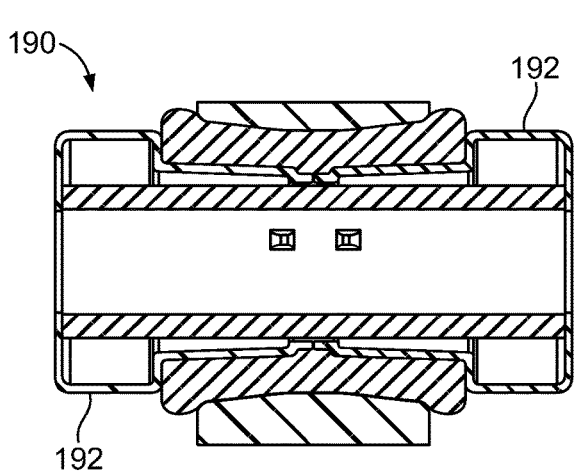
FIG. 17 illustrates a transverse cross-sectional view of a compression-limiting ring link assembly, according to an embodiment of the present disclosure.

FIG. 17 illustrates a transverse cross-sectional view of a compression-limiting ring link assembly 190, according to an embodiment of the present disclosure. The ring link assembly 190 is similar to the ring link assembly 170, except that a barrier 192 may be expanded to define an internal space. As such, the barrier 192 may not be a flattened piece of material, but, instead, an expanded block, for example.

Referring to FIGS. 1-17, bushing limiters, compression limiters, and bushings of varying shapes and sizes may be used, thereby providing a modular ring link assembly. Common connection interfaces allow for interchangeability of bushing limiters, bushings, and compression limiters, for example.

Figure 18:
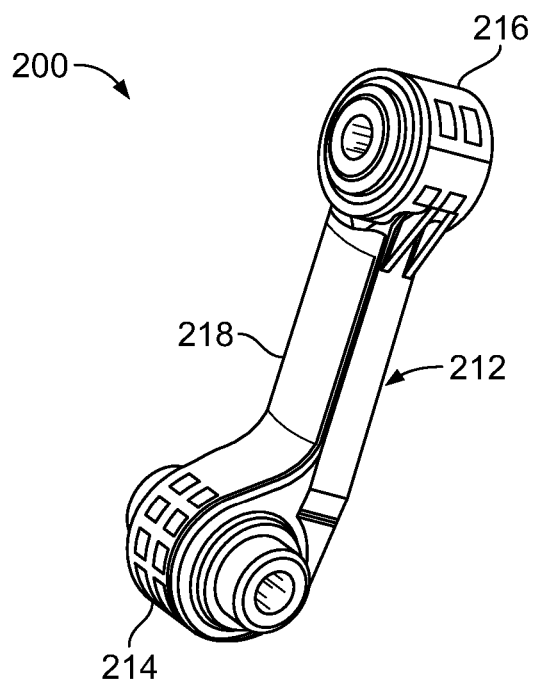
FIG. 18 illustrates a front perspective view of a linking assembly, according to an embodiment of the present disclosure.

FIG. 18 illustrates a front perspective view of a linking assembly 200, according to an embodiment of the present disclosure. The linking assembly 200 may include a main body 212 including a ring link assembly 214 connected to another ring link assembly 216 (at an opposite end of the main body 212) through a connecting beam 218. The ring link assemblies 214 and 216 may be any of those described above.

Figure 19:
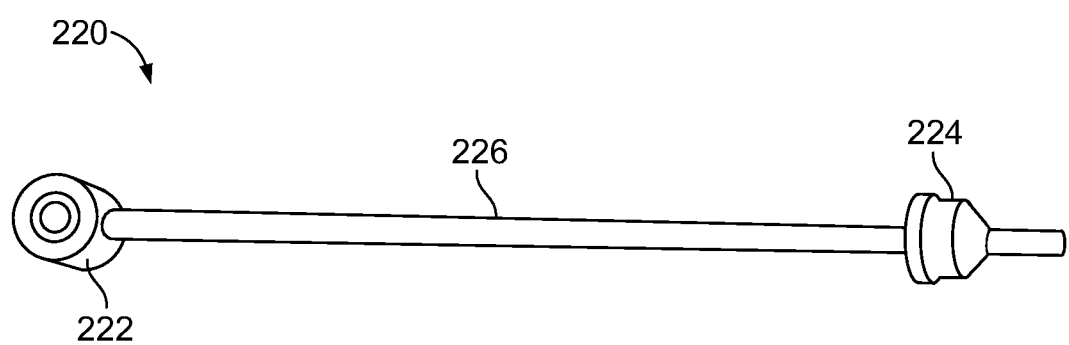
FIG. 19 illustrates a front view of a linking assembly, according to an embodiment of the present disclosure.

FIG. 19 illustrates a front view of a linking assembly 220, according to an embodiment of the present disclosure. The linking assembly 220 may include a ring link assembly 222, such as any of those described above, joined to a connecting member 224, such as a grommet, through a linear shaft 226.

Referring to FIGS. 1-19, embodiments of the present disclosure provide compression-limiting ring link assemblies. The ring link assemblies may minimize, eliminate, prevent, or otherwise reduce bushing shifting, migration, or other such movement. As such, embodiments of the present disclosure protect against premature wear and tear of the bushings. Further, embodiments of the present disclosure protect against debris infiltration, and minimize or otherwise reduce undesired noise, for example.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A ring link assembly, comprising:
   a connecting ring including an annular body defining a central opening;
   a bushing defining a central passage, wherein the bushing is retained by the connecting ring within the central opening, wherein the bushing comprises an inwardly-directed retained member;
   a compression limiter positioned within the central passage of the bushing; and
   first and second bushing limiters secured to the compression limiter at opposite ends, wherein the first and second bushing limiters securely connect to the compression limiter and the bushing, wherein the first and second bushing limiters cooperate to form a bushing-retaining recess therebetween, and wherein the inwardly-directed retained member is compressively retained within the bushing-retaining recess.

2. The ring link assembly of claim 1, wherein the compression limiter comprises at least one securing member that is configured to secure to a portion of one or both of the first and second bushing limiters.

3. The ring link assembly of claim 2, wherein each of the first and second bushing limiters comprises an end collar, and wherein the at least one securing member securely abuts into the end collar to secure the first and second bushing limiters to the compression limiter.

4. The ring link assembly of claim 1, wherein each of the first and second bushing limiters comprises one or more internal guide members that axially align the compression limiter within a central chamber.

5. The ring link assembly of claim 1, wherein each of the first and second bushing limiters comprises a tapered outer surface from a flared end to an end collar.

6. The ring link assembly of claim 1, wherein the inwardly-directed retained member comprises an inwardly-directed annular ridge.

7. The ring link assembly of claim 1, wherein each of the first and second bushing limiters includes a bushing-limiting barrier, and wherein the bushing is retained between the bushing-limiting barriers.

8. The ring link assembly of claim 1, wherein one or both of an outer and interior surface of the bushing is inwardly tapered from opposite ends toward a central sleeve.

9. The ring link assembly of claim 1, wherein one or both of an outer and interior surface of the bushing is straight.

10. The ring link assembly of claim 1, wherein the compression limiter extends past both ends of the bushing.

11. The ring link assembly of claim 10, wherein each of the first and second bushing limiters comprises an extension sleeve that extends over at least a portion of the compression limiter.

12. A ring link assembly, comprising:
   a bushing defining a central passage, wherein the bushing comprises an inwardly-directed retained member;
   a compression limiter positioned within the central passage of the bushing; and
   first and second bushing limiters secured to the compression limiter at opposite ends, wherein the first and second bushing limiters securely connect to the compression limiter and the bushing, wherein the first and second bushing limiters prevent the bushing from axially shifting relative to the compression limiter, wherein the first and second bushing limiters cooperate to form a bushing-retaining recess therebetween, and wherein the inwardly-directed is compressively retained within the bushing-retaining recess.

13. The ring link assembly of claim 12, wherein each of the first and second bushing limiters comprises an end collar, and wherein at least one securing member secures to the end collar to secure the first and second bushing limiters to the compression limiter.

14. The ring link assembly of claim 12, wherein each of the first and second bushing limiters comprises one or more internal guide members that axially align the compression limiter within a central chamber.

15. The ring link assembly of claim 12, wherein each of the first and second bushing limiters includes a bushing-limiting barrier, and wherein the bushing is retained between the bushing-limiting barriers.

16. A ring link assembly, comprising:
   a connecting ring including an annular body defining a central opening;

a bushing defining a central passage, wherein the bushing is retained by the connecting ring within the central opening, wherein the bushing comprises an inwardly-directed retained member;

a compression limiter positioned within the central passage of the bushing, wherein the compression limiter comprises at least one securing member that is configured to secure to a portion of one or both of the first and second bushing limiters; and first and second bushing limiters secured to the compression limiter at opposite ends, wherein the first and second bushing limiters securely connect to the compression limiter and the bushing, wherein the first and second bushing limiters prevent the bushing from axially shifting relative to the compression limiter, wherein the first and second bushing limiters cooperate to form a bushing-retaining recess therebetween, and wherein the inwardly-directed retained member is compressively retained within the bushing-retaining recess, wherein each of the first and second bushing limiters comprises: (a) an end collar, and wherein the at least one securing member engages the end collar to secure the first and second bushing limiters to the compression limiter, (b) one or more internal guide members that axially align the compression limiter within a central chamber, and (c) a bushing-limiting barrier, wherein the bushing is retained between the bushing-limiting barriers.

17. The ring link assembly of claim 16, wherein the compression limiter extends past both ends of the bushing, and wherein each of the first and second bushing limiters comprises an extension sleeve that extends over at least a portion of the compression limiter.

* * * * *